United States Patent

[11] 3,620,993

| [72] | Inventors | Ryoshiro Takano<br>Kamakura-shi;<br>Kunihiko Ishii, Kamakura-shi; Suezi Higo,<br>Yokosuka-shi, all of Japan |
|---|---|---|
| [21] | Appl. No. | 851,448 |
| [22] | Filed | Aug. 19, 1969 |
| [45] | Patented | Nov. 16, 1971 |
| [73] | Assignee | Sinloihi Co.<br>Konohana-ku, Osaka-shi, Japan |
| [32] | Priority | Aug. 30, 1968 |
| [33] | | Japan |
| [31] | | 43/62161 |

[54] COCONDENSATION RESIN OF FORMALDEHYDE, CYCLIC AMINOTRIAZINE AND ISOCYANURIC ACID
16 Claims, No Drawings

[52] U.S. Cl. .................................................... 260/37 N,
250/301.3, 260/39 P, 260/67.6

[51] Int. Cl. ..................................................... C08g 9/30,
C08g 51/04
[50] Field of Search ............................................ 252/301.3;
260/37 N, 39 P, 67.6

[56] References Cited
UNITED STATES PATENTS

| 3,303,168 | 2/1967 | Kazenas ........................ | 260/67.6 |
|---|---|---|---|
| 3,481,903 | 12/1968 | Dalelio ......................... | 260/67.6 |

Primary Examiner—Morris Liebman
Assistant Examiner—R. H. Zaitlen
Attorney—Stevens, Davis, Miller & Mosher ABSTRACT: A colored finely powdered resin composition prepared by cocondensation of cyanuric acid, isocyanuric acid or derivatives thereof with a cyclic aminotriazine and formaldehyde is well tolerable to solvents and particularly suitable for printing ink, textile printing or dip dyeing by pigment and coloring plastics.

COCONDENSATION RESIN OF FORMALDEHYDE, CYCLIC AMINOTRIAZINE AND ISOCYANURIC ACID

This invention relates to a colored finely powdered resin composition.

Heretofore, there have been methods of producing a fluorescent pigment in U.S. Pat. Nos. 2,809,954, 2,938,873, 3,116,256, and 3,198,741. These pigments are, however, generally badly tolerable to solvents, and it has been difficult to use them for gravure ink such as type-C (Nitro-cellulose Gravure Ink), type-E (Spirit Gravure Ink), type-P (Polyamide Gravure Ink) and type-V (Vinyl Gravure Ink) for silk screen ink for vinyl chloride resin. In order to produce a pigment that is well tolerable to solvents in accordance with the above-mentioned U.S. patent, it is necessary to increase the compounding ratio of a cyclic aminotriazine such as melamine or benzoguanamine as compared with the compounding ratio of an aromatic sulfonamide such as toluenesulfonamide. As a result, the produced resin necessarily becomes strong and is hardly pulverized, and so it was difficult to make it fine so as to show good printability. A condensation resin of an aromatic sulfonamide such as toluenesulfonamide with formaldehyde is easily pulverized and is completely intolerably to ketone, ester or alcohol and swells in an aromatic solvent such as toluene. On the other hand, a condensation resin of a cyclic aminotriazine such as melamine or benzoguanamine is well tolerable to solvents, but has so greatly rigid nature that it is impossible to be pulverized.

In the above-mentioned cocondensation resins, there were inevitable contradiction that good tolerance to solvent makes it difficult to be pulverized, while the nature of easy pulverizing worsens tolerance to solvents.

An object of the present invention is to provide a well solvent-tolerable and easily pulverized colored finely powdered resin composition.

Another object of the present invention is to provide a colored finely powdered resin particularly suitable for printing ink.

The composition of the present invention can be obtained by cocondensation of formaldehyde with a cyclic aminotriazine and a compound selected from the group consisting of cyanuric acid, isocyanuric acid and derivatives thereof followed by coloring with a dye and powdering.

As derivatives of a cyanuric acid and isocyanuric acid, there can be mentioned, for example, triarylisocyanurate, triacetonylisocyanurate, trimethylisocyanurate, tris(2,3-epoxypropyl)isocyanurate, tris(2-carboxymethyl)isocyanurate, tris(2-carboethoxy)isocyanurate etc. As a cyclic aminotriazine, there can be mentioned, for example, melamine, benzoguanamine, acetoguanamine, formoguanamine, propioguanamine, butyroguanamine, phenylacetoguanamine, δ-cyano-valeroguanamine, sebacoguanamine, adipoguanamine, γ-isopropenyl-γ-acetylpimeroguanamine, sym-diphenyladipoguanamine, pthaloguanamine, p,p'-bis-2,4-diamino-6-triadinyldiphenyl, 1,2-bis-2,4-diamino-6-triadinylnaphthalene, and 3,9-bis [2-(3,5-diamino-2,4,6-triazaphenyl)ethyl] 2,4,8,10-tetroxaspyro(5,5) undecane etc. As a coloring dye, there can be mentioned, for example, a basic dye such as Rhodamine B, Rhodamine 6GCP, Methyl-Violet FN, Crystal Violet FN or Victoria Blue-FB; and acidic dye, for example, Eosine, Erio Acid Red XB, Erio Acid Red XG, Supracem Violet 4BF or Brilliant Sulpho Flavine FF etc.; dispersion dye such as Celliton Pink FF3B, Celliton Pink 3B etc.; a dye soluble in solvents such as Azosol Brilliant Yellow-6GF, Azosol Fast Blue-GLA or Azosol Fast Blue-HLR; a reactive dye such as Remazol Turquoise Blue-G; fluorescent brightening agents such as Tinopal PGP. Further, as a pigment, there can be used Phthalocyanine Blue and Phthalocyanine Green etc.

The compounding ratio of the cyclic aminotriazine to cyanuric acid, isocyanuric acid or derivatives thereof which satisfies both solvent tolerance and easiness of pulverizing is in the range of 9 moles:1 mole to 1 mole:9 moles, preferably, however, 7 moles:3 moles to 3 moles:7 moles. Over the range of 9 moles:1 mole worsens greatly the nature to be pulverized, while under the range of 1 mole:9 moles worsens solvent tolerance greatly.

In the condensation of cyanuric acid, derivatives thereof, cyclic aminotriazine with formaldehyde, light resistance of the condensation product is improved by the addition of an aromatic sulfonamide. As the aromatic sulfonamide is, for example, p-toluenesulfonamide, o-toluenesulfonamide or a mixture thereof, benzenesulfonamide or tetralinsulfonamide.

The colored fine resin powder of the present invention can be utilized for printing ink, textile printing or dip dyeing of pigment, coloring of plastics and paints.

EXAMPLE 1

A mixture of 645 g. of isocyanuric acid (5 moles), 630 g. of melamine (5 moles) and 2,430 g. of formaline (formaldehyde 37 percent) was stirred on a water bath at 80° C. for 10–15 minutes, whereupon water layer and resin layer was separated to proceed methylol reaction. The water layer was separated, and 16 g. of Rhodamine B and 12 g. of Rhodamine 6GCP were added and the mixture was stirred well. The reaction mixture was put in a drying apparatus at 160° C. for 5 hours to complete the reaction. After cooling, the product was pulverized finely to obtain pink-colored resin powder.

EXAMPLE 2

A mixture of 129 g. of isocyanuric acid (1 mole), 1,197 g. of melamin (9.5 moles) and 2,554 g. of formalin (formaldehyde 37 percent) was stirred on a water bath at 80° C. for 15–20 minutes. Whereupon, methylol reaction takes place to separate water layer and resin layer. The water layer was separated, and 16 g. of Rhodamine B and 12 g. of Rhodamine 6GCP were added and the mixture was stirred well. The reaction mixture was put in a drying apparatus at 160° C. for 5 hours to complete the reaction. After cooling, the product was pulverized finely to obtain pink-colored resin powder.

EXAMPLE 3

A mixture of 1,161 g. of isocyanuric acid (9 moles), 126 g. of melamine (1 mole) and 2,430 g. of formalin (formaldehyde 37 percent) was stirred on a water bath at 80° C. for 30 minutes. Whereupon, methylol reaction takes place to separate water layer and resin layer. The water layer was separated, and 16 g. of Rhodamine B and 12 g. of Rhodamine 6GCP were added and the mixture was stirred well. The reaction mixture was put in a drying apparatus at 160° C. for 6 hours to complete the reaction. After cooling, the product was pulverized finally to obtain pink-colored resin powder.

EXAMPLE 4

A mixture of 935 g. of benzoguanamine (5 moles), 645 g. of isocyanuric acid (5 moles) and 2,027 g. of formalin (formaldehyde 37 percent) was stirred on a water bath at 80° C. for 10 minutes. Whereupon, methylol reaction takes place to separate water layer and resin layer. The water layer was separated, and 20 g. of Acid Violet 5N and the mixtures was stirred well. The reaction mixture was put in a drying apparatus at 160° C. for 5 hours to complete the reaction. After cooling, the product was pulverized finely to obtain violet-colored resin powder.

EXAMPLE 5

A mixture of 171 g. of p-toluenesulfonamide (1.0 mole) and 37.5 g. of paraformaldehyde (formaldehyde 80 percent) was heated on an oil bath at 140° C. to make a solution. Thereto were added 63 g. of melamine (0.5 mole) and 64.5 g. of isocyanuric acid (0.5 mole) to make a dispersion. Then, 3.5 g. of Rhodamine B and 2.4 g. of Rhodamine 6GCP were added and stirred well. 112.5 g. of paraformaldehyde was added and stirred vigorously to condense under dehydration. The reaction mixture was put in a drying apparatus at 160° C. for 3 hours to complete the reaction. After cooling, the product was pulverized to obtain pink-colored resin powder.

In the following table, the colored resin powder obtained by these examples is compared with the bluish red powder obtained by the example 8 in U.S. Pat. No. 2,809,954.

| Example No. | hours necessary to be pulverized to become to granule of the same diameter (note 1) | diameter of the granule at the same pulverizing hour (note 2) |
|---|---|---|
| 1 | 90 | 4.5 micron |
| 2 | 120 | 5.5 micron |
| 3 | 80 | 4.3 micron |
| 4 | 98 | 4.8 micron |
| 5 | 75 | 4.0 micron |
| Comparison ** | 100 | 5.0 micron |

Note 1: Hours necessary for pulverizing by high speed hammer mill as determined when comparison is 100.

Note 2: Measured by powder specific surface area apparatus of Shimazu Manufacturing Co., Ltd., Japan. It is shown that when the compounding ratio of isocyanuric acid and melamine is made 1 mole: 9.5 moles, easiness of pulverizing is lowered.

**The sample used in the comparison experiment is the powder prepared in accordance with example 8 of U.S. Pat. No. 2,809,954. The same applied hereinafter.

Each 1 g. of the powder prepared by the examples and the comparison was put in a test tube together with the solvent, and the state of the powder in the solvent after 24 hours is observed and shown in the following table.

| | Example No. | | | | | |
|---|---|---|---|---|---|---|
| | 1 | 2 | 3 | 4 | 5 | Comparison |
| Mineral terpen. | Insoluble | Insoluble | Insoluble | Insoluble | Insoluble | Insoluble. |
| Water | do | do | do | do | do | Do. |
| Methanol | do | do | do | do | do | Soluble. |
| Ethanol | do | do | do | do | do | Do. |
| Methyl ethyl ketone | do | do | do | do | do | Do. |
| Acetone | do | do | do | do | do | Do. |
| Methylcellosolve | do | do | do | do | do | Do. |
| Toluene | do | do | do | do | do | Swells. |
| Xylene | do | do | do | do | do | Partly swells. |

The powder is applied to type V Gravure ink described in the above-mentioned U.S. Pat. No. 2,809,954, and the change of viscosity is measured to observe the stability of the powder in ink. The result is shown in the following table.

The small increase of the viscosity means that solvent resistance is good.

| | Viscosity measured soon after the admixture with ink | Viscosity measured after 24 hours since admixture with ink |
|---|---|---|
| Example | | |
| 1 | 15 seconds 0 | 16 seconds 0 |
| 2 | 15 seconds 5 | 16 seconds 4 |
| 3 | 15 seconds 8 | 16 seconds 9 |
| 4 | 16 seconds 2 | 18 seconds 0 |
| 5 | 16 seconds 0 | 17 seconds 1 |
| Comparison | 28 seconds 4 | viscosity is greatly increased and shows no fluidity, and the measurement of viscosity is impossible. |

Note 1: The composition of the sample used in the above measurement of viscosity is composed of vinylite VYHH (Union Carbide Co., Ltd.) 30%, resin powder in comparison or example 30%, methyl ethyl ketone 30 % and ethyl acetate 10%.

Note 2: The measurement of viscosity is carried out by Zahn Cup No. 5. The powder obtained by example 1, 2, 3, 4 and 5 is not inferior to the comparison in fluorescent effect under ultraviolet light, and clearness and light resistance under day light.

We claim:

1. A colored finely pulverized resin composition consisting of the condensation product of formaldehyde with a cyclic aminotriazine and isocyanuric acid, or a derivative thereof wherein the mol ratio of cyclic aminotriazine to isocyanuric acid is in range of 9:1 to 1:9, preferably 7:3 to 3:7, and a sufficient amount of a dye or pigment to color the resin.

2. A colored finely pulverized resin composition according to claim 1 wherein the condensation product includes an aromatic monosulfonamide.

3. A colored finely pulverized resin composition according to claim 2 wherein the aromatic monosulfonamide is selected from the group consisting of ortho-toluenesulfonamide, paratoluenesulfonamide and mixtures thereof.

4. A colored finely pulverized resin composition according to claim 1, wherein the dye is a basic dyestuff.

5. A colored finely pulverized resin composition according to claim 4 wherein the dye is rhodamine.

6. A colored finely pulverized resin composition according to claim 1, wherein the dye is an acid dyestuff.

7. A colored finely divided pulverized resin composition according to claim 6 wherein the dye is acid violet.

8. A colored finely pulverized resin composition according to claim 1, wherein the dye is azosolbriliant yellow-6GF, (4-amino-1,8-naphthol 2',4'dimethylphenylimid).

9. A printing composition comprising, as the pigment, a colored finely divided pulverized resin composition according to claim 1.

10. A colored finely powdered resin composition according to claim 1 wherein the cyclic aminotriazine is melamine.

11. A colored finely powdered resin composition according to claim 1 wherein the cyclic aminotriazine is benzoguanamine.

12. A colored finely powdered resin composition according to claim 1 wherein the cyclic aminotriazine is acetoguanamine.

13. A colored finely powdered resin composition according to claim 1 wherein the cyclic aminotriazine is phthaloguanamine.

14. A colored finely powdered resin composition according to claim 1 wherein the cyclic aminotriazine is 3,9-bis[2-(3,5-diamino-2,4,6-triazaphenyl)ethyl]2,4,8,10-tetroxaspyro[5,5]undecane.

15. A colored finely powdered resin composition according to claim 1 wherein the aromatic monosulfonamide is benzenesulfonamide.

16. A colored finely powdered resin composition according to claim 2 wherein the aromatic monosulfonamide is tetralinsulfonamide.

* * * * *